(No Model.)

C. A. PETTIE.
PNEUMATIC NON-PUNCTURABLE TIRE.

No. 595,785. Patented Dec. 21, 1897.

WITNESSES:
L. N. Legendre
J. G. Tourrouen

INVENTOR
Chas. A. Pettie
BY Fred Barker
ATTORNEY

THE NORRIS PETERS CO., PHOTO-LITHO., WASHINGTON, D. C.

UNITED STATES PATENT OFFICE.

CHARLES A. PETTIE, OF BROOKLYN, NEW YORK, ASSIGNOR TO EMMA C. PETTIE, OF SAME PLACE, AND FREDERICK W. BARKER, OF NYACK, NEW YORK.

PNEUMATIC NON-PUNCTURABLE TIRE.

SPECIFICATION forming part of Letters Patent No. 595,785, dated December 21, 1897.

Application filed June 9, 1897. Serial No. 640,067. (No model.)

*To all whom it may concern:*

Be it known that I, CHARLES A. PETTIE, a citizen of the United States, residing at Brooklyn, in the county of Kings and State of New York, have invented certain new and useful Improvements in Pneumatic Non-Puncturable Tires, of which the following is a full, clear, and exact specification.

My invention relates to pneumatic tires.

The improvements consist in the following combination and construction, the details of which will first be fully described and the features and novelty then set forth and claimed.

Figure 1:
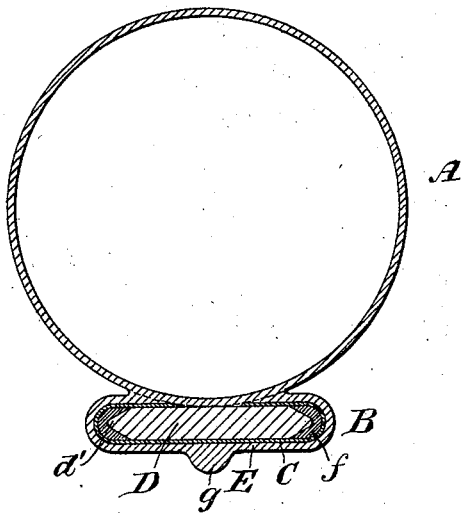
Figure 2:
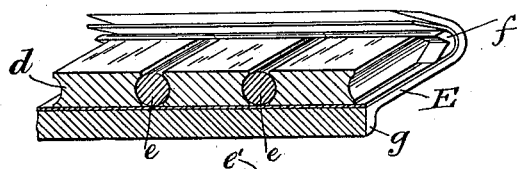
Figure 3:
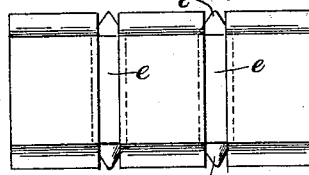
Figure 5:
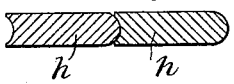
Figure 4:

Figure 1 represents a cross-section of a pneumatic tire to which my invention has been applied. Fig. 2 is a detailed section and perspective of one form of the tread portion of the tire. Fig. 3 is a plan view of several members of the articulated armor. Fig. 4 is a detailed transverse section of the modified form of the tread. Fig. 5 is a cross-section of a modified form of the articulated members.

In the drawings, A represents an ordinary form of pneumatic tire. I provide this tire with a puncture-proof armor B, consisting of a band comprising a series of articulated transverse members having concavo-convex abutting surfaces covered by an inclosing envelop. This armor is resilient and flexible and conforms to the movement of the pneumatic tire.

In the form illustrated in Figs. 1, 2, and 3 the articulated members consist of a series of transverse members $d$, having concave abutting bearing-surfaces upon their transverse edges. $e$ represents a series of rounded pins or bodies forming convex bearings, which are interposed between each adjacent pair of members $d$, whereby a concavo-convex abutting bearing is provided, permitting of flexure inwardly and outwardly between the several members of the armor. E is an inclosing envelop, of rubber or fabric, which surrounds the members and holds the same in place. I may bevel the outer edges of these members $d$ and $e$, and I may inclose said ends in a flexible socket-strip $f$, of rubber, within the inclosing band E.

In Fig. 5 I show a modification of the articulated armor, in which the pins or bodies $e$ are dispensed with. These members $h$ have convex bearings upon one side and concave bearings upon the opposite side, which extend out to the opposite sides or faces of the members, so that a concavo-convex abutting bearing is formed between each of the members $h$. The members are surrounded by an inclosing envelop E, as shown in the other figures.

In Fig. 1 I have provided a central portion of the flat tread with a central longitudinal rib $g$, projecting slightly above the surface thereof. The longitudinal rib $g$, when the tire is running upon a hard road, obviates the suction and back-dirt throw of the ordinary pneumatic tire. When the road is soft, there is brought immediately into action the broad flat tread, enabling the rider to propel the wheel much easier over such roads. When turning corners upon a hard road, the inner edge of the flat tread comes into contact with the surface and, besides preventing slipping, still obviates the suction and back-dirt throw before referred to.

The flexible socket-strip $f$ is not essential and may be omitted, nor consequently is it necessary to taper or bevel the edges of the pieces $d$ or $e$.

I may form the articulated band of transverse members of any suitable material. I find that wood is very well adapted for the purpose.

The armored tread of the tire is secured to the pneumatic tube in any suitable or known manner.

Where the central longitudinal rib $g$ is used it is essential that a flat tread be provided, for reasons hereinbefore set forth.

I claim—

1. A pneumatic tire having a flat-tread portion of substantially the width of the tire, the central portion of said flat tread being provided with a narrow longitudinal rib projecting slightly above the tread.

2. In a tire, a tread portion comprising an envelop, and a series of members therein having concaved sides, together with a series of rounded bodies which form pivots between the concaved sides of said members, substantially as set forth.

3. In a tire, a tread portion comprising a series of members having concaved sides and tapered ends and placed side by side to form an endless band, a series of rounded bodies having pointed ends and arranged one between each pair of members, a covering of textile fabric for said endless band and a bed of rubber within said covering, to form a socket for the tapered ends of the members and for the pointed ends of the rounded bodies; together with an outer envelop of rubber confining the aforesaid parts, the whole being adapted to be placed around the periphery of a pneumatic tire to form an impenetrable tread portion or shoe therefor, substantially as set forth.

4. In a pneumatic tire, an armor comprising a series of members having concavo-convex abutting edges extending out to the opposite sides thereof, and an inclosing envelop.

In testimony that I claim the foregoing I have hereunto set my hand this 1st day of June, 1897.

CHARLES A. PETTIE.

Witnesses:
F. W. BARKER,
L. N. LEGENDRE.